United States Patent
Li et al.

(10) Patent No.: US 12,144,032 B2
(45) Date of Patent: *Nov. 12, 2024

(54) METHODS PROVIDING RACH OCCASION INDICATION FOR RANDOM ACCESS PROCEDURE INITIATED BY PDCCH ORDER AND RELATED WIRELESS TERMINALS AND BASE STATIONS

(71) Applicant: Telefonaktiebolaget LM Ericsson (publ), Stockholm (SE)

(72) Inventors: Jingya Li, Gothenburg (SE); Johan Axnäs, Solna (SE); Asbjörn Grövlen, Stockholm (SE); Naga Vishnu Kanth Irukulapati, Västra Frölunda (SE); Xingqin Lin, Santa Clara, CA (US); Hongxia Zhao, Mölndal (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/967,967

(22) Filed: Oct. 18, 2022

(65) Prior Publication Data
US 2023/0041263 A1    Feb. 9, 2023

Related U.S. Application Data

(63) Continuation of application No. 16/970,117, filed as application No. PCT/IB2018/055731 on Jul. 31, 2018, now Pat. No. 11,523,437.
(Continued)

(51) Int. Cl.
*H04W 4/00* (2018.01)
*G01V 1/16* (2006.01)
(Continued)

(52) U.S. Cl.
CPC .......... *H04W 74/0833* (2013.01); *G01V 1/16* (2013.01); *G01V 1/3808* (2013.01);
(Continued)

(58) Field of Classification Search
None
See application file for complete search history.

(56) References Cited

U.S. PATENT DOCUMENTS

| 2010/0296467 A1 | 11/2010 | Pelletier et al. |
| 2019/0182800 A1* | 6/2019 | Park ................ H04W 74/0808 |
| 2019/0215861 A1 | 7/2019 | Son |

FOREIGN PATENT DOCUMENTS

| CN | 103096489 A | 5/2013 |
| CN | 104968054 A | 10/2015 |

(Continued)

OTHER PUBLICATIONS

International Search Report and Written Opinion of the International Searching Authority, PCT/IB2018/055731, mailed Oct. 30, 2018, 10 pages.
(Continued)

*Primary Examiner* — Zewdu A Beyen
(74) *Attorney, Agent, or Firm* — Sage Patent Group

(57) ABSTRACT

A method may be provided to operate a wireless terminal in communication with a network node. The method may include receiving a Physical Downlink Control Channel, PDCCH, order from the network node. The PDCCH order may include an identification for a Random Access CHannel RACH occasion to be used for a RACH message 1 preamble transmission. Moreover, the identification may include a first index that indicates a set of RACH occasions and a second index that indicates the RACH occasion associated with the set. The method may also include transmitting a (Continued)

Message 1 preamble to the network node using the RACH occasion responsive to the PDCCH order.

26 Claims, 19 Drawing Sheets

Related U.S. Application Data

(60) Provisional application No. 62/710,563, filed on Feb. 16, 2018.

(51) Int. Cl.
| | |
|---|---|
| *G01V 1/38* | (2006.01) |
| *H04W 56/00* | (2009.01) |
| *H04W 72/0446* | (2023.01) |
| *H04W 72/23* | (2023.01) |
| *H04W 74/00* | (2009.01) |
| *H04W 74/0833* | (2024.01) |

(52) U.S. Cl.
CPC ........ *G01V 1/3843* (2013.01); *H04W 56/001* (2013.01); *H04W 72/0446* (2013.01); *H04W 72/23* (2023.01); *H04W 74/006* (2013.01); *H04W 74/008* (2013.01); *G01V 2210/1423* (2013.01)

(56) References Cited

FOREIGN PATENT DOCUMENTS

| DK | 3554179 T3 | 8/2021 |
|---|---|---|
| DK | 3501186 T3 | 10/2021 |
| ES | 2901387 T3 | 3/2022 |
| WO | 2018082017 A1 | 5/2018 |
| WO | 2018110857 A1 | 6/2018 |
| WO | 2019/184956 A1 | 10/2019 |

OTHER PUBLICATIONS

"3rd Generation Partnership Project; Technical Specification Group Radio Access Network; NR; Medium Access Control (MAC) Protocol Specification (Release 15)," 3GPP TS 38.321 V15.0.0 (Dec. 2017) (XP051392362) 56 pages.
"RACH Procedures and Resource Configuration," 3GPP TSG RAN WG1 Meeting #89, R1-1706976, Agenda Item 7.1.1.4.2, Huawei, HiSilicon, May 15-19, 2017, Hangzhou, CN (XP051272206) 8 pages.
"Discussion on Remaining Details on PRACH Formats," 3GPP TSG RAN WG1 Meeting 90bis, R1-1718183, Agenda Item 7.1.4.1, NTT Docomo, Inc., Oct. 9-13, 2019, Prague, CZ (XP051341365) 12 pages.
"Discussion on Remaining Details on PRACH Procedure," 3GPP TSG RAN WG1 Meeting 90bis, R1-1718184, Agenda Item 7.1.4.2, NTT Docomo, Inc., Oct. 9-13, 2019, Prague, CZ (XP051341366) 6 pages.
"Remaining Details on the RACH Procedure," 3GPP TSG RAN WG1 Meeting AH 1801, R1-1800898, Agenda Item 7.1.4.2, Ericsson, Jan. 22-26, 2018, Vancouver, BC, CA (XP051384492) 10 pages.
"Summary of Remaining Details on RACH Procedure," 3GPP TSG RAN WG1 Meeting NR 1801, R1-1801274, Agenda Item 7.1.4.2, Nokia, Nokia Shanghai Bell, Jan. 22-26, 2018, Vancouver, BC, CA (XP051385493) 54 pages.
Office Action mailed Feb. 19, 2023 for Chinese Patent Application No. 201880089642.X, 9 pages.
Ericsson; 3GPP TSG RAN WG1 Meeting #91, Agenda Item 7.1.4.2; "Remaining Details on RACH Procedure"; R1-1720941; Reno, Nevada; Nov. 27-Dec. 1, 2017; 23 pages.
Huawei, Hisilicon; 3GPP TSG RAN WG1 NR Ad-Hoc Meeting, Agenda Item 5.1.1.4.4; "RACH Procedures and Resource Configuration"; R1-1710478; Qingdao, China; Jun. 27-30, 2017; 4 pages.
Intention to Grant mailed Mar. 6, 2023 for European Patent Application No. 18760034.1, 55 pages.
Notice of Allowance mailed Nov. 2, 2023 for Japanese Patent Application No. 2022-169378, 3 pages.
Ericsson; Remaining details of RACH procedure; R1-1802946; 3GPP TSG RAN WG1 Meeting #92; Agenda Item 7.1.1.4.2; Athens, Greece; Feb. 26-Mar. 2, 2018; 7 pages.
Brazilian Notice of Allowance for Brazilian Patent Application No. BR112020016349-0, dated Aug. 28, 2024, 5 pages.

* cited by examiner

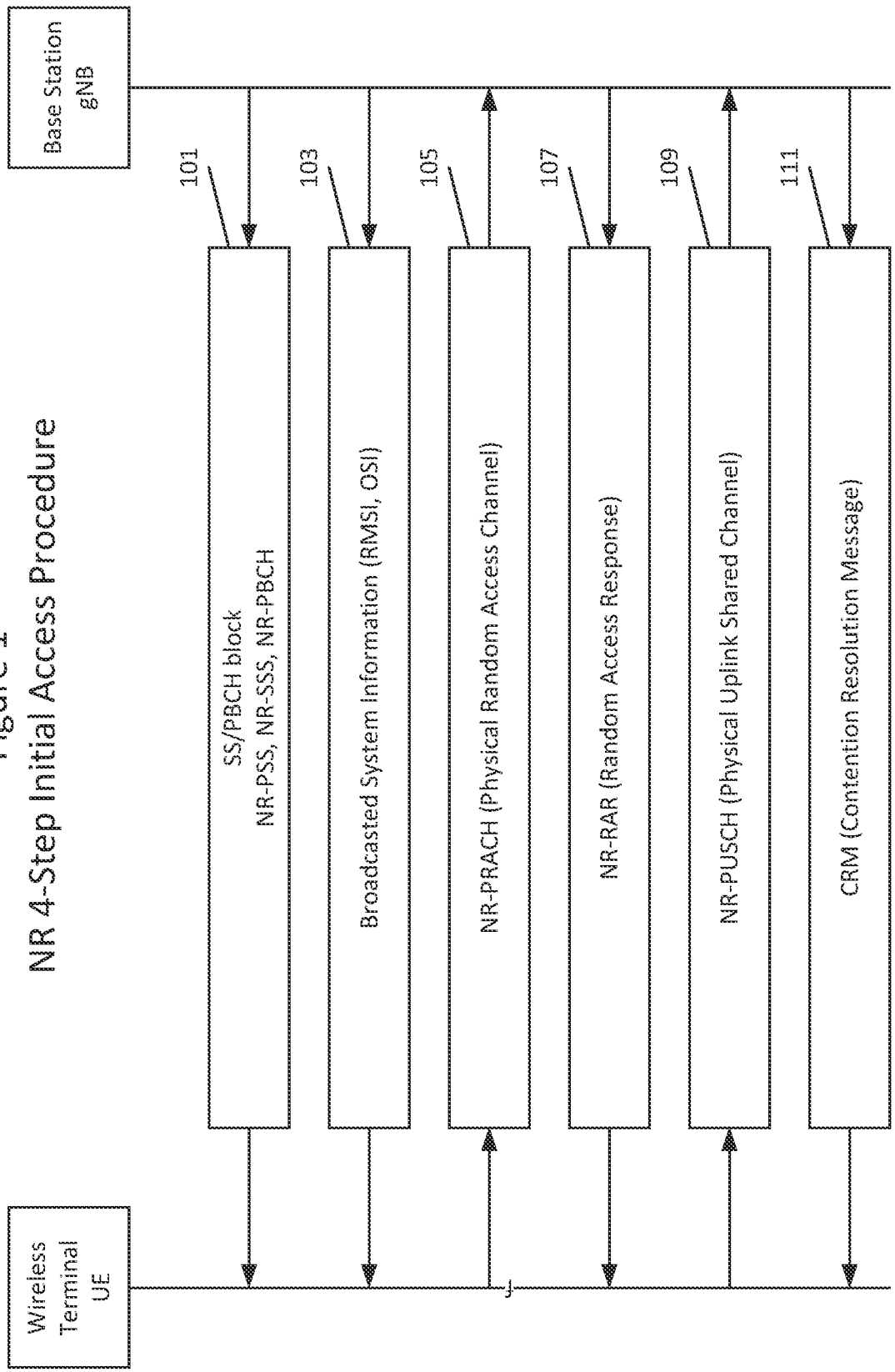

Two RACH configuration periods to map all SSBs

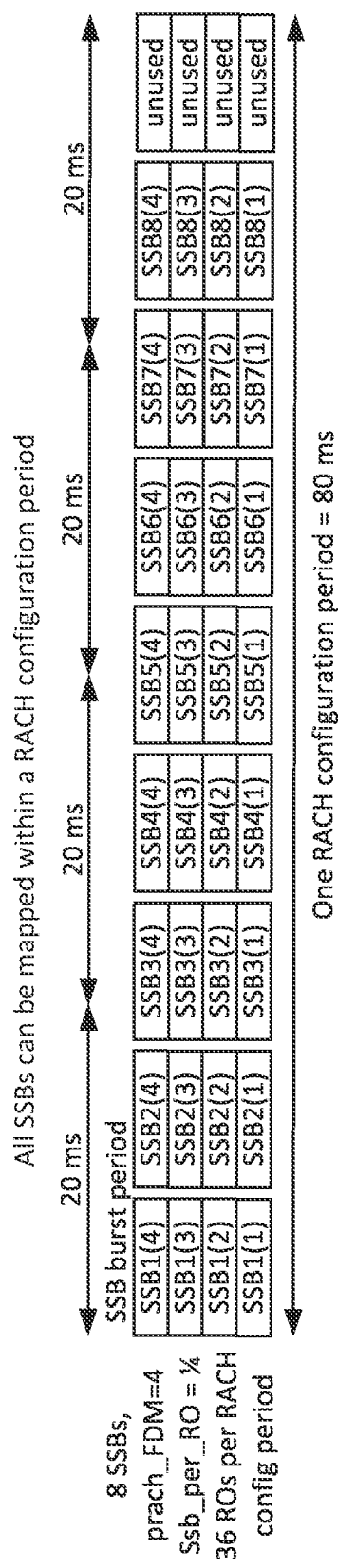
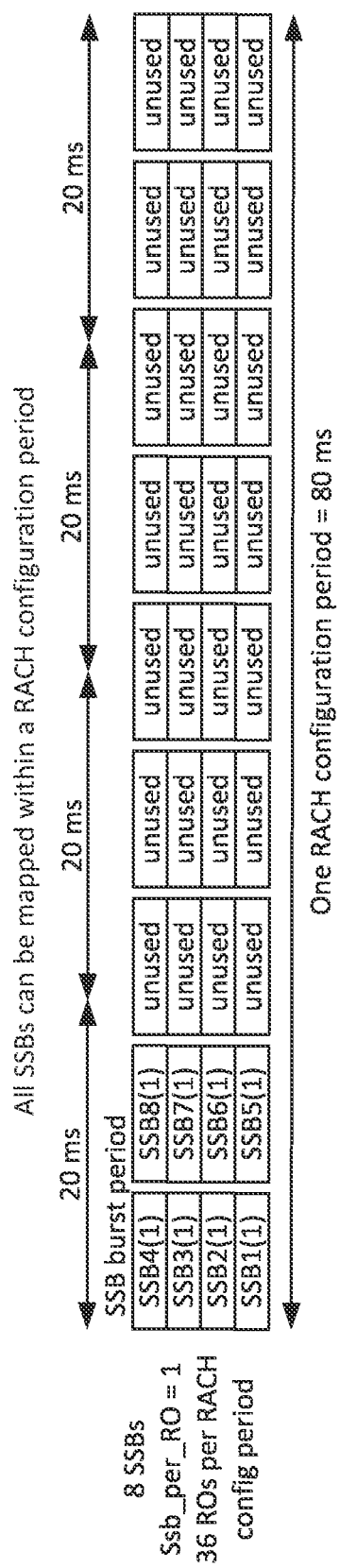

Two RACH configuration periods to map all SSBs

Example of SSB and RO_index mapping. Cyclically repeating of SSB mapping in a RACH configuration period.

Example of SSB and RO_index mapping. Cyclically repeating of SSB mapping in a RACH configuration period.

Example of SSB and RO_index mapping. Cyclically repeating of SSB mapping in a RACH configuration period.

Example of SSB and RO_index mapping. Cyclically repeating of SSB mapping in a RACH configuration period.

Example of SSB and RO_index mapping. Cyclically repeating of SSB mapping in a RACH configuration period.

Figure 7
Table 1. Random access configurations for FR1 and paired spectrum.

| PRACH Configuration Index | Preamble format | $n_{SFN} \mod x = y$ | | Subframe number | Starting symbol | Number of PRACH slots within a subframe | Number of PRACH occasions within a RACH slot |
|---|---|---|---|---|---|---|---|
| | | $x$ | $y$ | | | | |
| 0 | 0 | 2 | 1 | 1 | - | - | - |
| 1 | 0 | 2 | 1 | 4 | - | - | - |
| 2 | 0 | 2 | 1 | 7 | - | - | - |
| 3 | 0 | 1 | 0 | 1 | - | - | - |
| 4 | 0 | 1 | 0 | 4 | - | - | - |
| 5 | 0 | 1 | 0 | 7 | - | - | - |
| 6 | 0 | 1 | 0 | 1,6 | - | - | - |
| 7 | 0 | 1 | 0 | 2,7 | - | - | - |
| 8 | 0 | 1 | 0 | 3,8 | - | - | - |
| 9 | 0 | 1 | 0 | 1,4,7 | - | - | - |
| 10 | 0 | 1 | 0 | 2,5,8 | - | - | - |
| 11 | 0 | 1 | 0 | 3,6,9 | - | - | - |
| 12 | 0 | 1 | 0 | 0,2,4,6,8 | - | - | - |
| 13 | 0 | 1 | 0 | 1,3,5,7,9 | - | - | - |
| 14 | 0 | 1 | 0 | 0,1,2,3,4,5,6,7,8,9 | - | - | - |

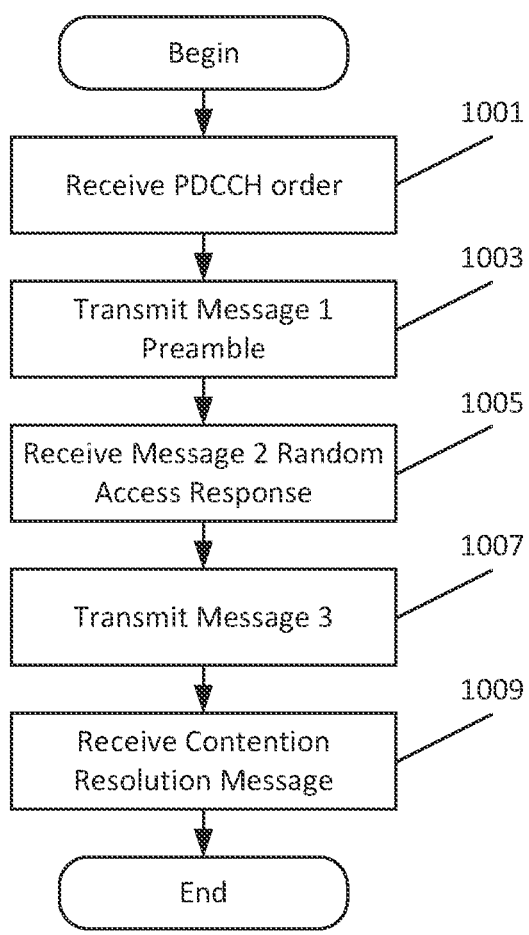
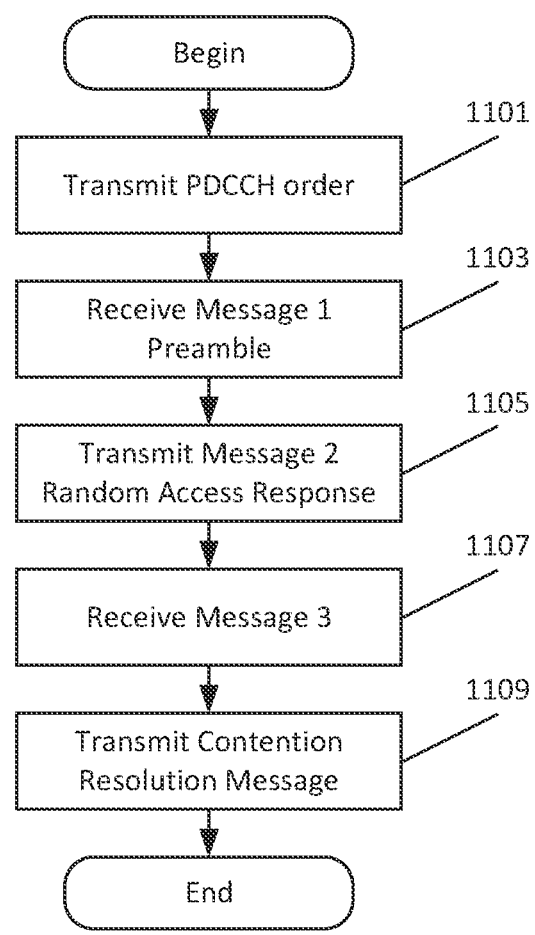

METHODS PROVIDING RACH OCCASION INDICATION FOR RANDOM ACCESS PROCEDURE INITIATED BY PDCCH ORDER AND RELATED WIRELESS TERMINALS AND BASE STATIONS

CROSS-REFERENCE TO RELATED APPLICATIONS

This application is a continuation of U.S. patent application Ser. No. 16/970,117, filed on Aug. 14, 2020, which is a 35 U.S.C. § 371 national stage application of PCT International Application No. PCT/IB2018/055731 filed on Jul. 31, 2018, which in turn claims domestic priority to U.S. Provisional Patent Application No. 62/710,563, filed on Feb. 16, 2018, the disclosures and content of which are incorporated by reference herein in their entirety.

TECHNICAL FIELD

The present disclosure relates to communications, and more particularly, to wireless communications and related wireless terminals and network nodes.

BACKGROUND

A random-access (RA) procedure is a key function in a cellular system. In LTE, a wireless terminal UE that would like to access the network initiates the random-access procedure by transmitting a preamble (Msg1) in the uplink on the Physical Random-access Channel (PRACH). A gNB (next generation Node B, or TRP. Transmission and Reception Point, i.e., a base station, access node, etc.) receiving the preamble and detecting the random-access attempt will respond in the downlink by transmitting a random-access response (RAR, Msg2). The RAR carries an uplink scheduling grant for the UE to continue the procedure by transmitting a subsequent message in the uplink (Msg3 or message 3) for terminal identification. A similar procedure is envisioned for New Radio NR, as illustrated in FIG. 1.

Before transmission of the PRACH preamble, the UE receives both a set of synchronization signals and configuration parameters on a broadcast channel in an SS-block (e.g., NR-PSS, NR-SSS, NR-PBCH) at block 101, possibly complemented with configuration parameters received on yet another channel.

FIG. 1 illustrates an NR 4-step initial access procedure. At block 101, base station gNB may transmit an SS/PBCH block including NR-PSS, NR-SSS, and NR-PBCH, and at block 103, base station gNB may transmit Broadcast System Information including RMSI (Remaining Minimum System Information) and OSI (Other System Information). At block 105, wireless terminal UE may transmit an NR-PRACH (new radio physical random-access channel) preamble, and at block 107, base station gNB may transmit NR-RAR (new radio random-access response) in response to the NR-PRACH preamble. At block 109, wireless terminal UE may transmit on NR-PUSCH (new radio physical uplink shared channel) using a resource/resources indicated by the NR-RAR, and at block 111, base station gNB may transmit CMR (Contention Resolution Message).

A random-access procedure can be initiated by a Physical Downlink Control Channel PDCCH order initiated by the network with a "PDCCH order"; e.g., to synchronize the UpLink UL prior to DownLink DL data transmission to allow transmission of, e.g., HARQ (hybrid automatic repeat request) feedback when UL time alignment may have been lost. A PDCCH ordered random-access procedure can also be used for positioning and obtaining timing advance alignment between a primary cell and a secondary cell.

In LTE, a random-access procedure initiated by a PDCCH order is supported by using Downlink Control Information DCI format 1A. According to 3GPP TS 36.212 v14.1.1 (Section 5.3.3.1.3), the following information is transmitted by means of the DCI format 1A, when it is used for random-access procedure initiated by a PDCCH order:

Carrier indicator—0 or 3 bits. This field is present according to the definitions in [3].

Flag for format0/format1A differentiation or flag for format0A/format1A differentiation 1 bit, where value 0 indicates format 0 or format 0A and value 1 indicates format 1A Localized/Distributed VRB assignment flag—1 bit is set to '0'

Resource block assignment—

$$\lceil \log_2(N_{RB}^{DL}(N_{RB}^{DL}+1)/2) \rceil$$

bits, where all bits shall be set to 1

Preamble Index—6 bits

PRACH Mask Index—4 bits

All the remaining bits in format 1A for compact scheduling assignment of one PDSCH codeword are set to zero The layer 1 random-access procedure is triggered upon request of a PRACH transmission by higher layers, which configures the PRACH transmission parameters, like the preamble format, frequency resources, etc.

In LTE, the signaled preamble index in the DCI carried via the PDCCH order informs the UE directly which preamble to use for the PRACH transmission. And the PRACH Mask Index in the DCI indicates the time resource to be used for the PRACH transmission. Mechanisms for LTE random-access, however, may not work for New Radio NR.

SUMMARY

According to some embodiments of inventive concepts, a method of operating a wireless terminal in communication with a base station may be provided. The method may include receiving a Physical Downlink Control Channel PDCCH order from the network node, with the PDCCH order including an identification for a Random-access CHannel RACH occasion to be used for a RACH message 1 preamble transmission. The identification may include a first index that indicates a set of RACH occasions and a second index that indicates the RACH occasion associated with the set. In addition, the method may include transmitting a Message 1 preamble to the network node using the RACH occasion responsive to the PDCCH order.

According to some other embodiments of inventive concepts, a method of operating a base station in communication with a wireless terminal may be provided. The method may include transmitting a Physical Downlink Control Channel PDCCH order to the wireless terminal, with the PDCCH order including an identification for a Random-access CHannel RACH occasion to be used for a RACH message 1 preamble transmission from the wireless terminal. The identification may include a first index that indicates a set of RACH occasions and a second index that indicates the RACH occasion associated with the set. In addition, the method may include receiving a Message 1 preamble from the wireless terminal using the RACH occasion.

By including a first index that indicates a set of RACH occasions and a second index that indicates the RACH occasion associated with the set, some embodiments of inventive concepts may support frequency division multiplexing FDM as used in new radio NR for physical random-access channel PRACH transmission.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 1 is a message diagram illustrating an NR 4-step initial access procedure;

FIGS. 4A and 4B are diagrams illustrating configurations with all SSMs mapped within a RACH configuration period;

FIG. 7 is a table providing random-access configurations for FR1 and paired spectrum according to some embodiments of inventive concepts;

FIG. 10 is a flow chart illustrating wireless terminal operations according to some embodiments of inventive concepts;

FIG. 11 is a flow chart illustrating base station operations according to some embodiments of inventive concepts;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 8:
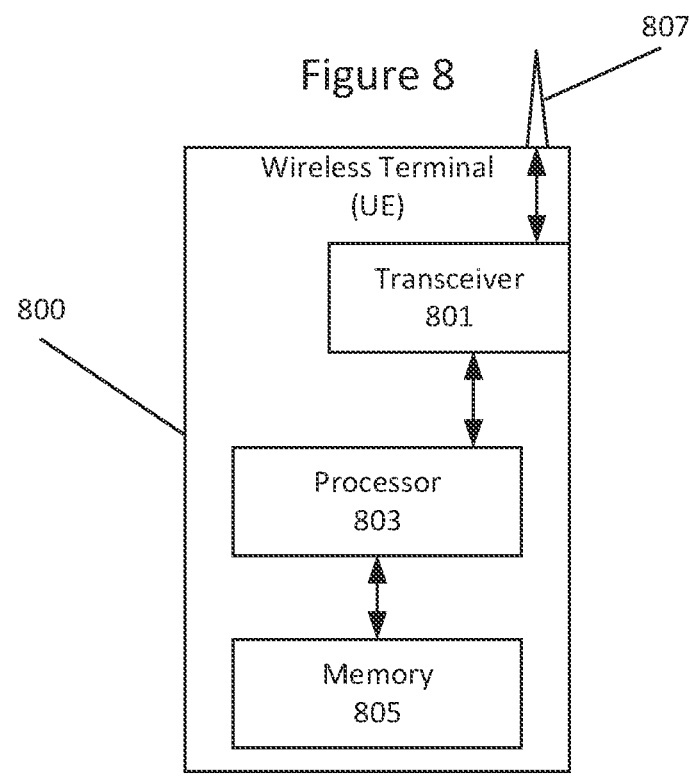
FIG. 8 is a block diagram of a wireless terminal UE according to some embodiments of inventive concepts.

FIG. 8 is a block diagram illustrating elements of a wireless terminal UE 800 (also referred to as a wireless device, a wireless communication device, a mobile terminal, a wireless communication terminal, user equipment, a user equipment node/terminal/device, etc.) configured to provide wireless communication according to embodiments of inventive concepts. As shown, wireless terminal UE may include an antenna 807, and a transceiver circuit 801 (also referred to as a transceiver) including a transmitter and a receiver configured to provide uplink and downlink radio communications with a base station eNB of a radio access network. Wireless terminal UE may also include a processor circuit 803 (also referred to as a processor) coupled to the transceiver circuit, and a memory circuit 805 (also referred to as memory) coupled to the processor circuit. The memory circuit 805 may include computer readable program code that when executed by the processor circuit 803 causes the processor circuit to perform operations according to embodiments disclosed herein. According to other embodiments, processor circuit 803 may be defined to include memory so that a separate memory circuit is not required. Wireless terminal UE may also include an interface (such as a user interface) coupled with processor 803, and/or wireless terminal UE may be incorporated in a vehicle.

As discussed herein, operations of wireless terminal UE may be performed by processor 803 and/or transceiver 801. For example, processor 803 may control transceiver 801 to transmit communications through transceiver 801 over a radio interface to a base station gNB and/or to receive communications through transceiver 801 from a base station over a radio interface. Moreover, modules may be stored in memory 805, and these modules may provide instructions so that when instructions of a module are executed by processor 803, processor 803 performs respective operations (e.g., operations discussed below with respect to Example Embodiments).

Figure 9:
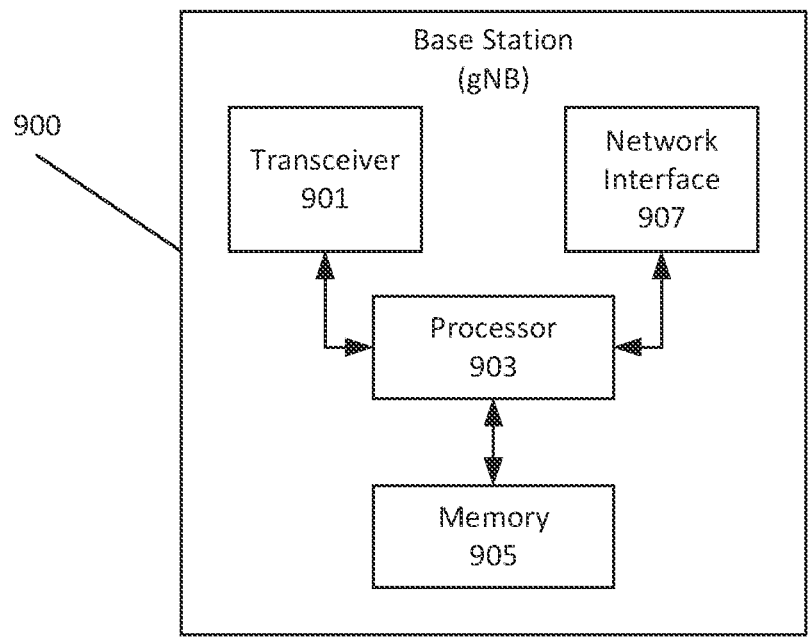
FIG. 9 is a block diagram of a base station gNB according to some embodiments of inventive concepts.

FIG. 9 is a block diagram illustrating elements of a base station 900 (also referred to as a network node, base station, eNodeB, eNB, gNodeB, gNB, etc.) of a Radio Access Network (RAN) configured to provide cellular communication according to embodiments of inventive concepts. As shown, the base station may include a transceiver circuit 901 (also referred to as a transceiver) including a transmitter and a receiver configured to provide uplink and downlink radio communications with wireless terminals. The base station may include a network interface circuit 907 (also referred to as a network interface) configured to provide communications with other nodes (e.g., with other base stations and/or other entities) of the RAN and/or a local area network. The base station may also include a processor circuit 903 (also referred to as a processor) coupled to the transceiver circuit, the network interface circuit, and a memory circuit 905 (also referred to as memory). The memory circuit 905 may include computer readable program code that when executed by the processor circuit 903 causes the processor circuit to perform operations according to embodiments disclosed herein. According to other embodiments, processor circuit 903 may be defined to include memory so that a separate memory circuit is not required.

As discussed herein, operations of the base station may be performed by processor 903, network interface 907, and/or transceiver 901. For example, processor 903 may control transceiver 901 to transmit communications through transceiver 901 over a radio interface to one or more wireless terminals UEs and/or to receive communications through transceiver 901 from one or more wireless terminals UEs over a radio interface. Similarly, processor 903 may control network interface 907 to transmit communications through network interface 907 to one or more other network nodes/entities and/or to receive communications through network interface from one or more other network nodes/entities. Moreover, modules may be stored in memory 905, and these modules may provide instructions so that when instructions of a module are executed by processor 903, processor 903 performs respective operations.

In LTE, when a random-access procedure is initiated by a PDCCH order, a Mask index will be sent on DCI, which is used to indicate to the UE at which Random-access Channel RACH occasion the Physical Random-access Channel PRACH shall be transmitted. In this way, potential conflict with transmissions from other UEs may be reduced/avoided. The possible RACH occasion to be selected is specified in the PRACH configuration table as a subframe number.

However, this mechanism may not work for NR, because: 1) PRACH Frequency Division Multiplexing FDM is allowed in NR (i.e., up to 8 RACH occasions may be configured at the same time instance); 2) In NR, the RACH configuration table supports multiple RACH occasions within one RACH slot and multiple RACH slots within one subframe; and 3) there is an association between a Synchronization Signal Block SSB index and RACH Occasions (RO) when mapping SSBs onto different ROs. Therefore, a new RO indication mechanism may need to be designed for PDCCH ordered PRACH transmission in NR.

According to some embodiments of inventive concepts, a signaling mechanism may be provided that uses a RACH Occasion (RO) index field in the DCI to identify the RO(s) for a PRACH transmission initiated using a PDCCH order.

The RO index field can be used to directly indicate the RO index number within a RACH configuration, or it can be used to indicate the RO index number associated to an SSB index. For the latter case, the RO for a PRACH transmission is identified by the RO index together with the SSB index. The SSB index can be based on the best SSB interpreted by the gNB and the UE, or it can be directly signaled in the DCI for PDCCH order.

If multiple ROs are configured/signaled for a PDCCH ordered PRACH transmission, then, a UE behavior is specified such that the UE and the network knows which RO will be used for PRACH transmission. For example, the UE should transmit PRACH at the earliest possible RO in the time domain, and if FDMed (Frequency Division Multiplexed) RO is configured, then the UE should select the first RO in the frequency domain.

According to some embodiments of inventive concepts, a random-access procedure may be initiated by a PDCCH order in NR, where a UE is assigned a RACH Occasion (RO) to use for preamble transmission.

According to some embodiments of inventive concepts, a RACH Occasion (RO) indicator field may be introduced in the DCI for a random-access procedure which is initiated by a PDCCH order. By using this indicator field, together with the RRC (Radio Resource Control) parameters like ssb-per-RO, PRACH-FDMed, PRACH configuration index, etc., the UE may know the exact RACH occasion to use to transmit a preamble.

According to first embodiments, an RO index field may be used to directly indicate the RO index number within a RACH configuration period.

It is assumed that the ROs are numbered in the same way as for SSB to RO mapping in NR, i.e.,
 i. In the order of increasing the number of frequency multiplexed RACH occasions and then
 ii. In the order of increasing the number of time multiplexed RACH occasions within a RACH slot
 iii. In the order of increasing the number of RACH slots Then, only using the RO index parameter may be sufficient to identify the RO for PRACH transmission.

Figure 2A:
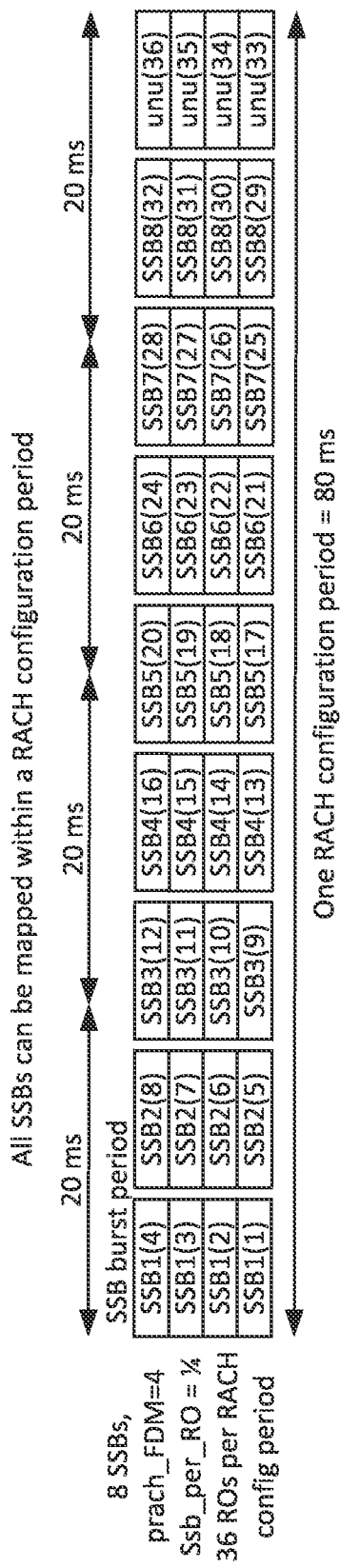
FIGS. 2A and 2B are diagrams illustrating configurations with all SSBs mapped within a RACH configuration period according to some embodiments of inventive concepts.
Figure 2B:
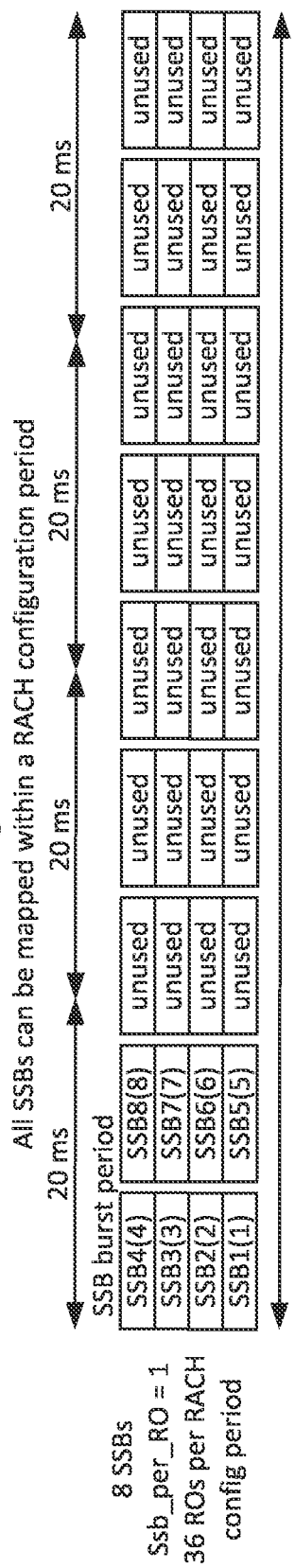
Figure 3:
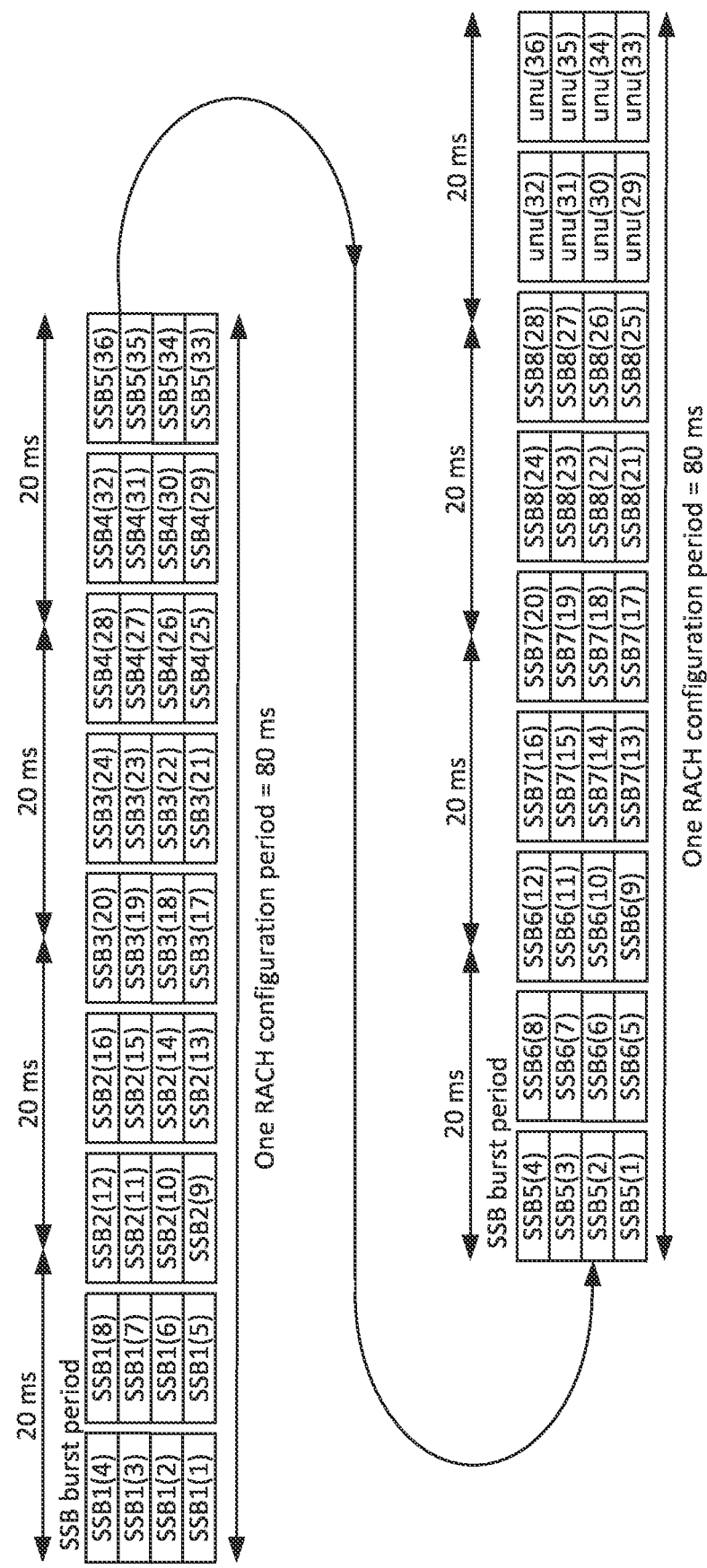
FIG. 3 is a diagram illustrating a configuration with all SSBs mapped to two RACH configuration periods according to some embodiments of inventive concepts.

In FIGS. 2A and 2B and in FIG. 3, some examples are provided on how the RO index can be used to signal the RO for a PDCCH order.

In FIGS. 2A and 2B and in FIG. 3, each labeled box represents an RO (i.e., each box labeled "SSBm(n)"). Each RACH configuration period may thus include a plurality of RO's in the time domain (e.g., in each RACH slot) and 4 RO's in the frequency domain (within a RACH slot). The text "SSBm(n)" in each box denotes an RO index number n within a RACH configuration period, and this RO is associated to SSBm. The RACH configuration period is assumed to be 80 ms, and the SSB burst period is assumed to be 20 ms. The number of SSBs transmitted in one SSB burst period is 8. FIGS. 2A and 2B show two examples where not all ROs within a RACH configuration period are needed to map all SSBs. The remaining ROs within a RACH configuration period may be left unused. FIG. 3 shows one example with ssb_per_RO=⅛, and two RACH configuration periods are used/needed to map all SSBs.

In FIGS. 2A and 2B, all SSBs can be mapped within a RACH configuration period.

In FIG. 3, two RACH configuration periods may be used to map all SSBs.

If all SSBs can be mapped in one RACH configuration period (the examples shown in FIGS. 2A and 2B), then, a RO index number may give a unique RO to use for PRACH transmission. If more than one RACH configuration period is used/needed to map all SSBs (the example shown in FIG. 3), then, an RO index number may give a subset of ROs that can be used for PRACH transmission within the SSB mapping period. The exact RO to use for PRACH transmission may depend on the timing for PRACH transmission, i.e., the minimum time gap between the PDDCH order and the transmission of PRACH.

In some embodiments, the RO index field gives more than one RO that can be used for PRACH transmission. Then, the exact RO for PRACH transmission may be selected based on the PRACH transmission timing.

In some embodiments, the SSB mapping to RO may not be cyclically repeated within a RACH configuration period, then, the maximum value of RO index that will be used for PDCCH order may depend on the maximum number of SSBs within an SSB burst period, and the maximum number of ROs that can be configured for one SSB.

In other embodiments, cyclically repeating the SSB mapping within a RACH configuration is allowed, then, the maximum value of RO index that will be used for PDCCH order may depend on the maximum number of RO time instances within a RACH configuration period, and the maximum number of ROs that can be configured for one SSB.

In some embodiments, when the value of RO index is set to a default value, for example when RO index=0, then, all RO candidates in the SSB mapping period are available to the UE for its preamble transmission. Then, a UE behavior is specified such that the UE and the network know which RO will be used for PRACH transmission. For example, the UE should transmit PRACH at the earliest possible RO in the time domain and if FDMed RO is configured, then the UE should select the first RO in the frequency domain.

According to some other embodiments, the RO index field in the DCI may be used to indicate the RO number associated to an SSB index. The RO for PRACH transmission is identified by the RO index together with an SSB index. The SSB index can be based on the best SSB interpreted by the gNB and the UE, or it can be directly signaled in the DCI for PDCCH order.

In a first case of such embodiments, no cyclically repeating SSB mapping is used in a RACH configuration period.

In the following discussion, two examples are provided to show how the SSB-index/CSI-index and RO index parameters can be used to assign a RO to the UE for preamble transmission. Note that these examples assume no cyclic repetition of SSB mapping within a RACH configuration period.

Figure 5:
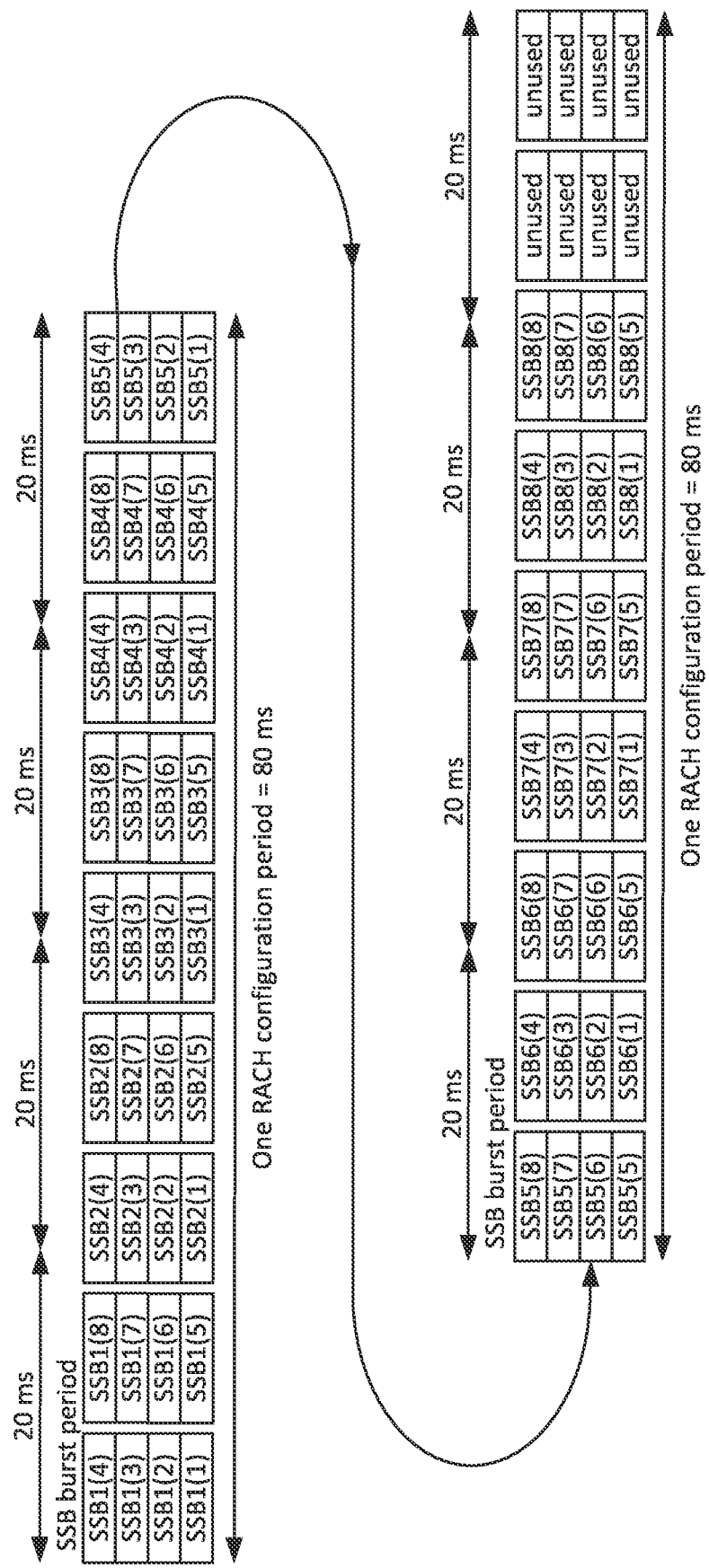
FIG. 5 is a diagram illustrating all SSBs mapped to two RACH configuration periods according to some embodiments of inventive concepts.
Figure 6A:
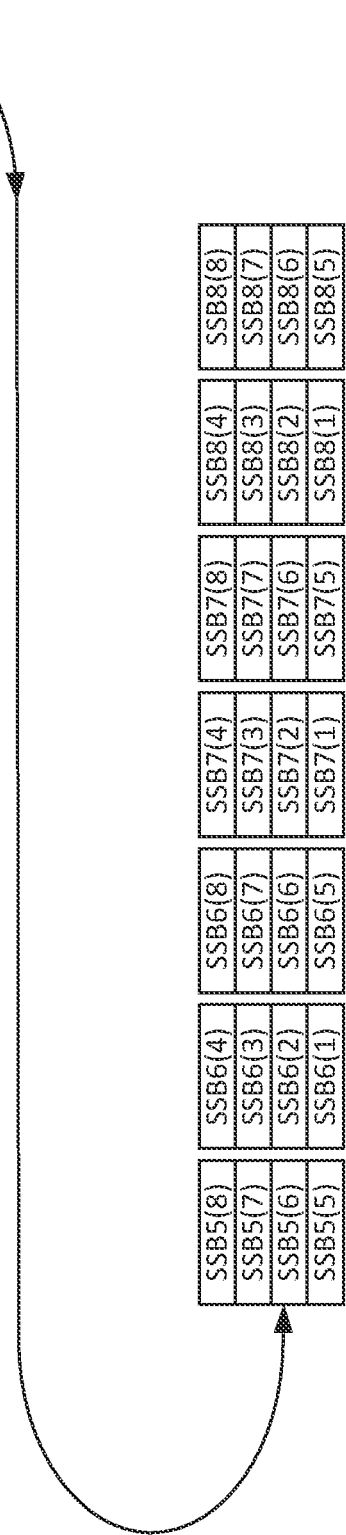
FIGS. 6A, 6B, 6C, 6D, and 6E are diagrams illustrating SSB and RO_index mapping with cyclic repeating of SSB mapping in a RACH configuration period according to some embodiments of inventive concepts.
Figure 6B:
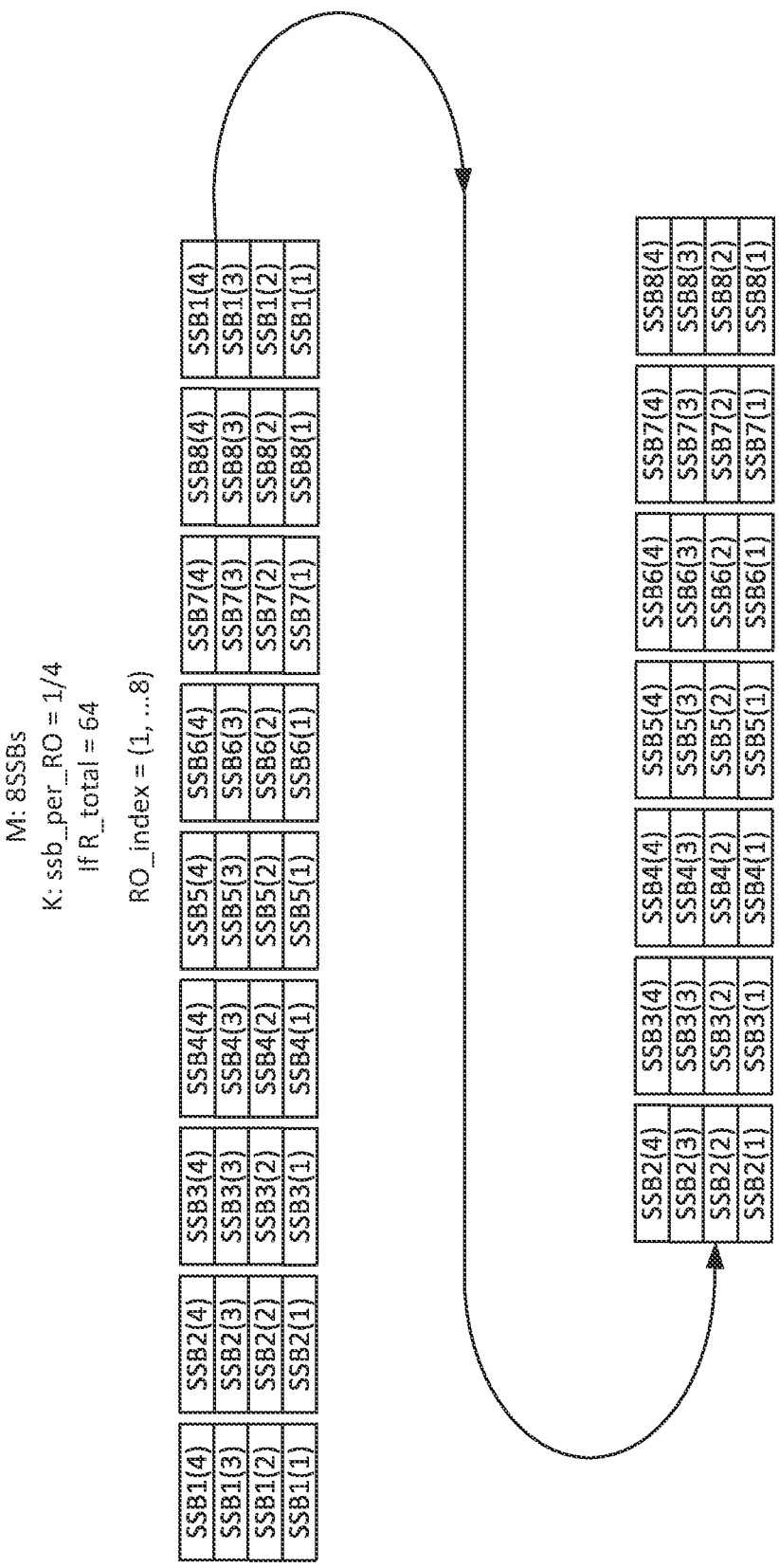
Figure 6C:
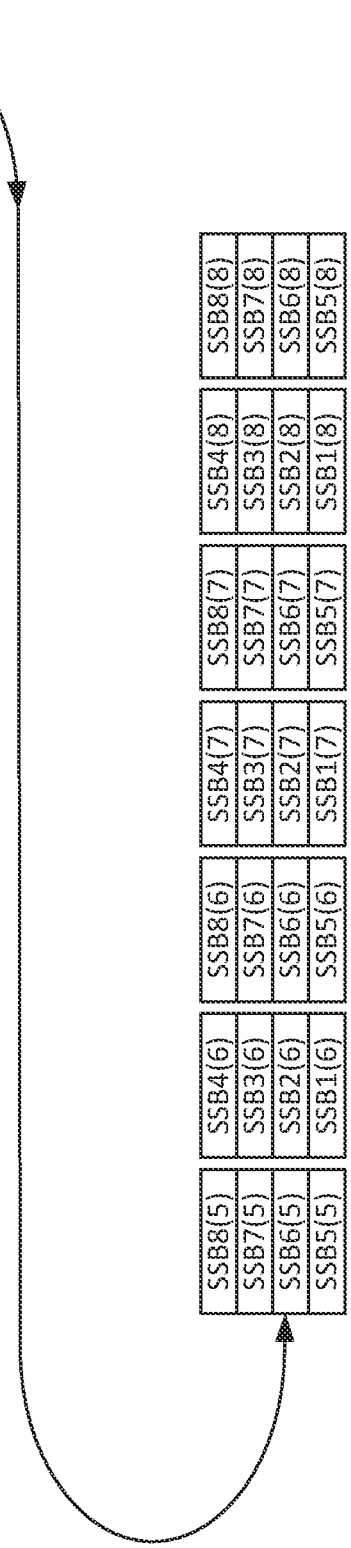
Figure 6D:
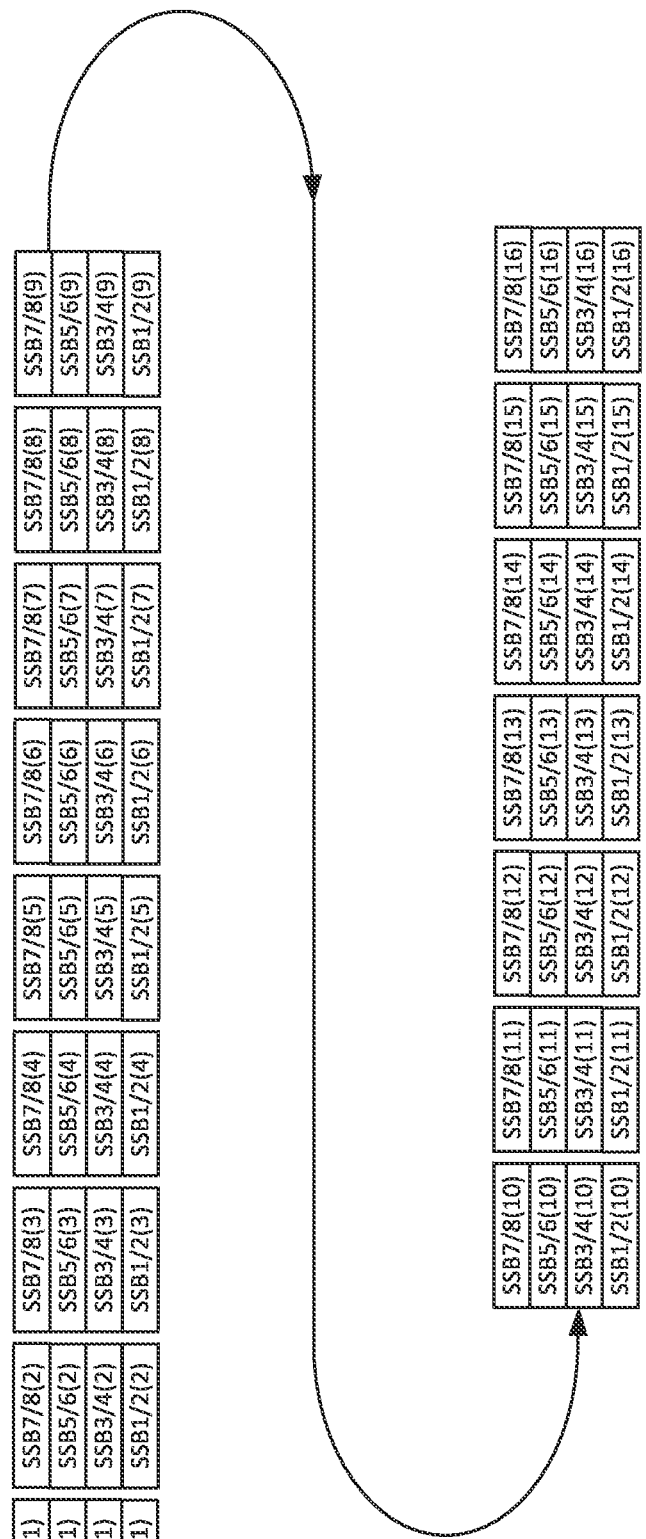
Figure 6E:
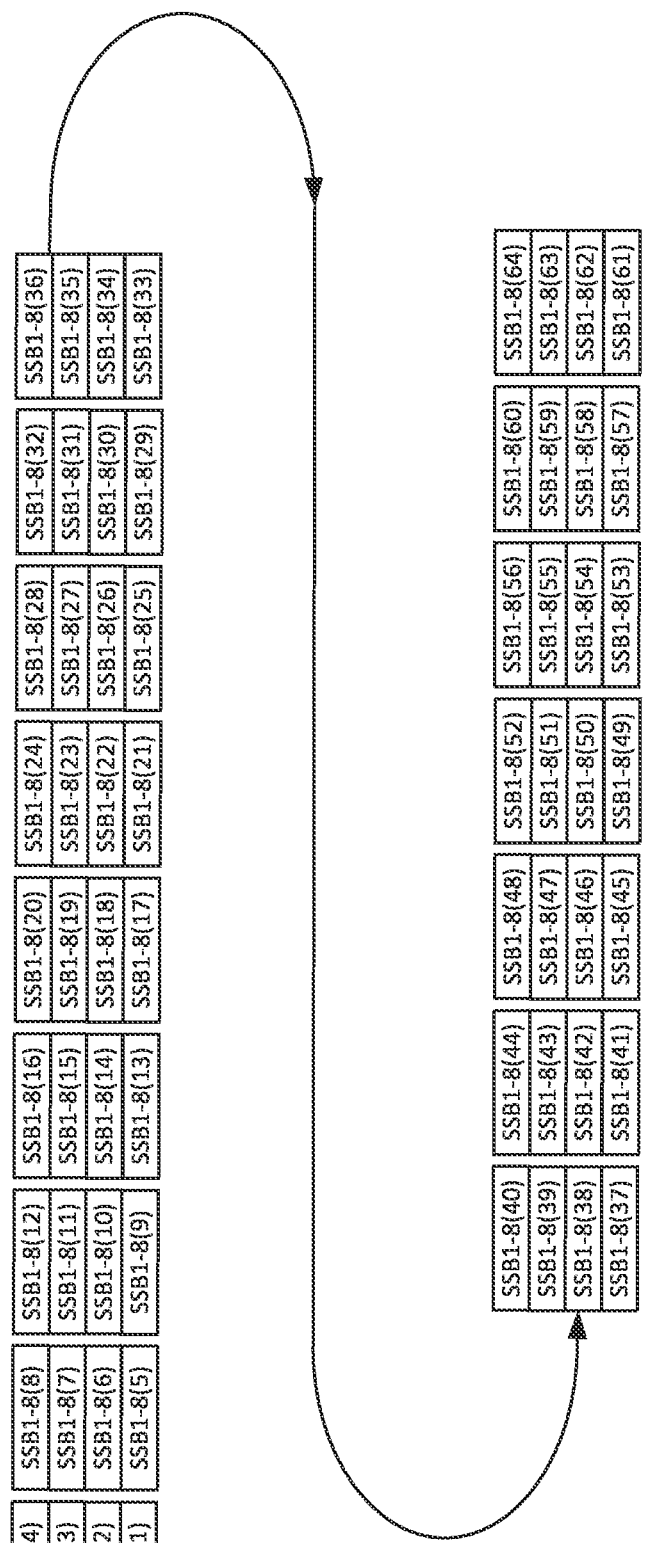

In FIGS. 4A and 4B, all SSBs can be mapped within a RACH configuration period. In FIG. 5, two RACH configuration periods are used to map all SSBs.

In FIGS. 4A and 4B and in FIG. 5, each labeled box represents an RO, the text "SSBm(n)" in each box denotes the RO index n associated to the SSBm. FIGS. 4A and 4B respectively show two examples where 8 SSBs are transmitted in each SSB burst period, and not all ROs within a RACH configuration period are needed to map all SSBs. The remaining ROs within a RACH configuration may be left unused. FIG. 5 shows one example where 8 SSBs are transmitted in each SSB burst period, and two RACH configuration periods are used/needed to map all SSBs.

Assume that SSB-index=m indicates that the UE should transmit a preamble associated to SSB m, and RO-index=n indicates that the UE should use the n-th RO that is associated to the signaled SSB. Then, SSB-index=m and RO-index=n can be used to assign a specific RO (i.e., the RO marked as SSBm(n) in FIGS. 4A and 4B and in FIG. 5) for its preamble transmission.

The maximum number of SSBs within an SSB burst period can be 4, 8 and/or 64, depending on the SubCarrier Spacing SCS of PBCH. Therefore, a maximum 6 bits may be used/needed for the SSB-index parameter, if it is signaled.

Considering that the maximum number of ROs that one SSB can be mapped to is 8 (1/ssb_per_RO), 3 bits may be needed for the RO-index field in the DCI for PDCCH order. Note that the size of RO-index parameter can increase significantly if cyclically repeating the SSB mapping within a RACH configuration is allowed.

In some embodiments, when the value of RO index is set to a default value, for example when RO index=0, then, all RO candidates associated to all SSBs or all ROs associated to the signaled/best SSB are available to the UE for its preamble transmission. Then, a UE behavior is specified such that the UE and the network knows which RO will be used for PRACH transmission. For example, the UE should transmit PRACH at the earliest possible RO in the time domain and if FDMed RO is configured, then the UE should select the first RO in the frequency domain.

In a second case of such embodiments, cyclically repeating SSB mapping may be used in a RACH configuration period.

Defined as RO_index={0, 1, . . . ,R}. R is calculated based on values in the PRACH configuration table, total number of transmitted SSB and RRC parameters ssb-per-RO as well as prach-FDM. For a given PRACH configuration, within the configuration period, the total number of possible RACH occasion can be calculated as $$RO\_total = F * \text{size(subframe number)} * \text{(Number of PRACH slots within a subframe)} * \text{(Number of PRACH occasions within a RACH slot)},$$

where F stands for the value specified by RRC parameter prach-FDM, which is a two-bit parameter and the value range is agreed to be $\{1, 2, 4, 8\}$. The "subframe number", "Number of PRACH slots within a subframe" and "Number of PRACH occasions within a RACH slot" are read from configuration table. If the value is un-defined, then set them to be 1. As an example, for the table shown in Table 1 [section 6.3.3, 38.211] of FIG. 7, when PRACH configuration index is set to 14, then subframe number={0,1,2,3,4,5,6,7,8,9} which gives that size(subframe number)=10, set undefined Number of PRACH slots within a subframe=1 and Number of PRACH occasions within a RACH slot=1, in the case of F=4, the total number of RACH occasions RO_total within one configuration period is RO_total=4*10*1*1=40.

Table 1 of FIG. 7 provides Random-access configurations for FR1 and paired spectrum.

Letting M stand for the total number of transmitted SSB, K stands for the value configured by ssb-per-RO, i.e., K ∈ $\{1/8, 1/4, 1/2, 1, 2, 4, 8, 16\}$ based on the latest agreements in 3GPP meeting (will be added into the specification), then the value range of RO_index is calculated as $$RO\_index = \{0, 1, \ldots, R\} \text{ for } K = \{1/8, 1/4, 1/2, 1\}, \text{ where } R = RO\_total/M;$$

$$RO\_index = \{0, 1, \ldots, R\} \text{ for } K = \{2, 4, 8, 16\}, \text{ where } R = RO\_total/M*K.$$

An example of the association between SSB and RO_index is illustrated in FIGS. 6A, 6B, 6C, and 6D. Here, each colored box represents an RO, the text "SSBm(n)" in each box denotes the RO index n associated to the SSB m. In this example, the SSB is mapped on the RO according to the agreed rule which will be added into 3GPP TS 38.213, that is:

Actually transmitted SS/PBCH blocks are associated to RACH transmission according in the following order:
  First in increasing preamble indices within a single RACH occasion.
  Then in increasing number of frequency multiplexed RACH occasion.
  Then in increasing number of time-domain RACH occasion within a RACH slot.
  Then in increasing number of RACH slots.

Assuming that the total number of transmitted SSB M=8, the prach-FDM value F=4, and varying value of ssb-per-RO K. The RO_total=64 assuming the time domain RACH occasion within a configuration period is 16 for the predefined PRACH configuration. As shown in FIGS. 6A, 6B, 6C, and 6D, when UE is signaled with an RO_index by PDCCH order, together with the known SSB-index, UE will find the exact occasion to transmit a preamble. In the case of RO_index=0, all occasions mapped to the SSB-index can be selected for the transmission.

FIGS. 6A, 6B, 6C, and 6D illustrate examples of SSB and RO_index mapping, where SSB mapping in a RACH configuration period is cyclically repeated.

According to still other embodiments, an RO index may be used to indicate the RO number associated to a group/repetition index.

In such embodiments, a group/repetition index (denoted by group_id) and a RO index per group may be introduced to signal the UE the RACH occasion for preamble transmission. Let $M$=total number of transmitted $SSB$;

$K$=ssb-per-RO,$K \in \{1/8,1/4,1/2,1,2,4,8,16\}$;

$RO\_total=F*$size(subframe number)*(Number of PRACH slots within a subframe)*(Number of PRACH occasions within a RACH slot).

Then the value of group/repetition index can be calculated as $group\_id=\{1, \ldots ,G\}$, where $G$=floor($RO\_total/M*K$).

The RO index per group may be used to specify the RO index within the group. It may require a maximum of 3-bits, since one SSB can be mapped to as many as 8 ROs within a group.

When a UE is signaled with group_id and RO index per group, the exact occasion for PRACH transmission will be specified.

According to some embodiments of inventive concepts, a signaling mechanism may thus be provided for RACH Occasion indication for random-access initiated by PDCCH order.

Operations of a wireless terminal UE 800 will now be discussed with reference to the flow chart of FIG. 10 according to some embodiments of inventive concepts. For example, the wireless terminal may be implemented using the structure of FIG. 8 with modules stored in memory 805 so that the modules provide instructions so that when the instructions of a module are executed by processor 803, processor 803 performs respective operations. Processor 803 of wireless terminal UE 800 may thus transmit and/or receive communications to/from one or more network nodes (e.g., base stations or other nodes/entities) of a wireless communication network through transceiver 801.

At block 1001, processor 803 may receive a Physical Downlink Control Channel (PDCCH) order from the network node 900 through transceiver 801. The PDCCH order may include an identification for a Random Access CHannel (RACH) occasion to be used for a RACH message 1 preamble transmission. More particularly, the identification may include a first index that indicates a set of RACH occasions and a second index that indicates the RACH occasion associated with the set. The first index may be a synchronization signal block (SSB) index that indicates a set of RACH occasions that are associated with the SSB index. In addition, the second index may be a RACH occasion (RO) index that indicates the RACH occasion associated with the set of RACH occasions indicated by the SSB index. Moreover, the identification may be provided in Downlink Control information (DCI) carried via the PDCCH order.

At block 1003, processor 803 may transmit a Message 1 (Msg1) preamble for a random-access procedure through transceiver 801 to network node 900 responsive to the PDCCH order. More particularly, the Message 1 preamble may be transmitted using the RACH occasion indicated by the first and second indexes.

At block 1005, processor 803 may receive a Message 2 random-access response of the random-access procedure from network node 900 through transceiver 801 after transmitting the Message 1 preamble. At block 1007, processor 803 may transmit a Message 3 for the random-access procedure through transceiver 801 to network node 900 on an uplink channel responsive to receiving the Message 2 random-access response. At block 1009, processor 803 may receive a Message 4 contention resolution message of the random-access procedure from network node 900 through transceiver 801 after transmitting the Message 3.

Various operations of FIG. 10 may be optional with respect to some embodiments. For example, operations of blocks 1005, 1007, and 1009 may be optional.

Operations of a network node (e.g., a base station gNB) 900 of a wireless communication network will now be discussed with reference to the flow chart of FIG. 11. For example, network node 900 may be implemented using the structure of FIG. 9 with modules stored in memory 905 so that the modules provide instructions so that when the instructions of a module are executed by processor 903, processor 903 performs respective operations. Processor 903 of network node 900 may thus transmit and/or receive communications to/from one or more other network nodes/entities of a wireless communication network through network interface 907, and network node 900 may transmit and/or receive communications to/from one or more wireless terminals through transceiver 901.

At block 1101, processor 903 may transmit a Physical Downlink Control Channel (PDCCH) order through transceiver 901 to wireless terminal 800. The PDCCH order may include an identification for a Random Access Channel (RACH) occasion to be used for a RACH message 1 preamble transmission from the wireless terminal. More particularly, the identification may include a first index that indicates a set of RACH occasions and a second index that indicates the RACH occasion associated with the set.

The first index may be a synchronization signal block (SSB) index that indicates a set of RACH occasions that are associated to the SSB index. In addition, the second index may be a RACH occasion (RO) index that indicates the RACH occasion associated with the set of RACH occasions indicated by the SSB index. Moreover, the identification may be provided in Downlink Control information (DCI) carried via the PDCCH order.

At block 1103, processor 903 may receive a Message 1 preamble for a random-access procedure from the wireless terminal 800 through transceiver 903 using the RACH occasion indicated by the first and second indexes. At block 1105, processor 903 may transmit a Message 2 random-access response of the random-access procedure through transceiver 901 to wireless terminal 800 responsive to receiving the Message 1 preamble. At block 1107, processor 903 may receive a Message 3 for the random-access procedure on an uplink channel from the wireless terminal 800 through transceiver 901 after transmitting the Message 2 random-access response. At block 1109, processor 903 may transmit a Message 4 contention resolution message of the random-access procedure through transceiver 901 to wireless terminal 800 responsive to receiving the Message 3.

Various operations of FIG. 11 may be optional with respect to some embodiments. For example, operations of blocks 1105, 1107, and 1109 may be optional.

Example Embodiments of inventive concepts are discussed below by way of example.

1. A method of operating a wireless terminal in communication with a base station, the method comprising: receiving a Physical Downlink Control Channel, PDCCH, order from the base station, wherein an identification is provided by the base station for a Random-access CHannel, RACH, occasion to be used for a RACH message 1 preamble transmission, wherein the identification defines a RACH slot of a plurality of RACH slots in a RACH configuration period; and responsive to the PDCCH order, transmitting a Message 1 preamble to the base station using the RACH slot within the RACH configuration period defined by the identification.

2. The method of Embodiment 1, wherein the identification further defines a frequency resource of a plurality of frequency resources within the RACH slot defined by the identification.

3. The method of any of Embodiments 1-2, wherein the identification is provided in Downlink Control information, DCI, carried via the PDCCH order.

4. A wireless terminal (UE), wherein the wireless terminal is adapted to perform operations according to any of Embodiments 1-3.

5. A wireless terminal (UE) comprising: a transceiver (801) configured to provide wireless communication in a wireless communication network; and a processor (803) coupled with the transceiver, wherein the processor is configured to provide wireless communication with the wireless communication network through the transceiver, wherein the processor is further configured to perform operations according to any of Embodiments 1-3.

6. A method of operating a base station in communication with a wireless terminal, the method comprising: transmitting a Physical Downlink Control Channel, PDCCH, to the wireless terminal, wherein an identification is provided by the base station to the wireless terminal for a Random-access CHannel, RACH, occasion to be used for a RACH message 1 preamble transmission from the wireless terminal, wherein the identification defines a RACH slot of a plurality of RACH slots in a RACH configuration period; and receiving a Message 1 preamble from the wireless terminal using the RACH slot within the RACH configuration period defined by the identification.

7. The method of Embodiment 6, wherein the identification further defines a frequency resource of a plurality of frequency resources within the RACH slot defined by the identification.

8. The method of any of Embodiments 6-7, wherein the identification is provided in Downlink Control information, DCI, carried via the PDCCH order.

9. A base station (eNB), wherein the base station is adapted to perform operations according to any of Embodiments 6-8.

10. A base station (eNB) comprising: a transceiver (901) configured to provide wireless communication with a wireless terminal; and a processor (903) coupled with the transceiver, wherein the processor is configured to provide wireless communication with a wireless terminal through the transceiver, and wherein the processor is further configured to perform operations according to any of Embodiments 6-8.

Figure 12:
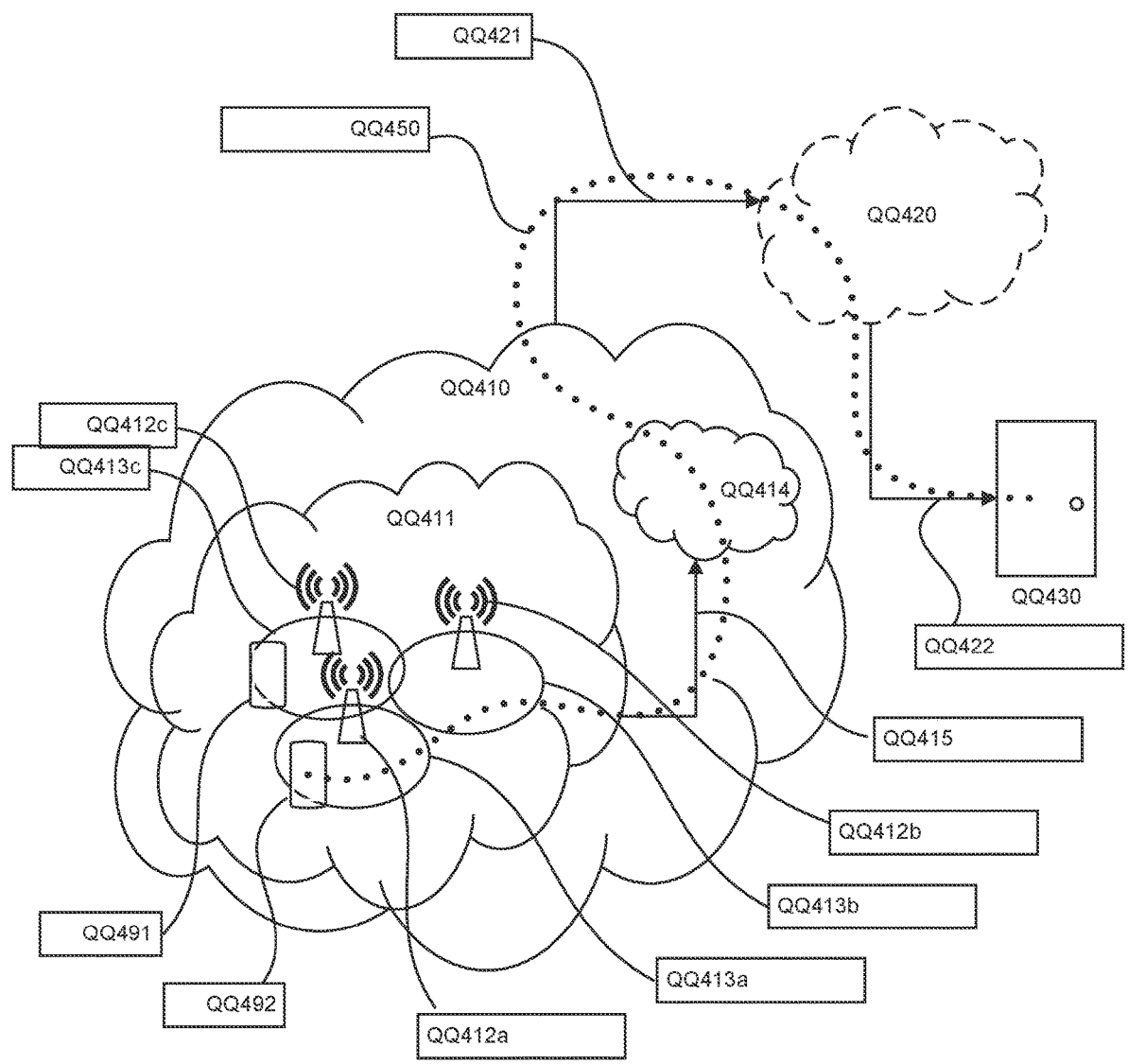
FIG. 12 is a schematic diagram illustrating a communication system according to some embodiments of inventive concepts.

With reference to FIG. 12, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 12 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 13. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 13) served by base station QQ520. Communication interface QQ526 may be configured to facilitate connection QQ560 to host computer QQ510. Connection QQ560 may be direct or it may pass through a core network (not shown in FIG. 13) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 13:
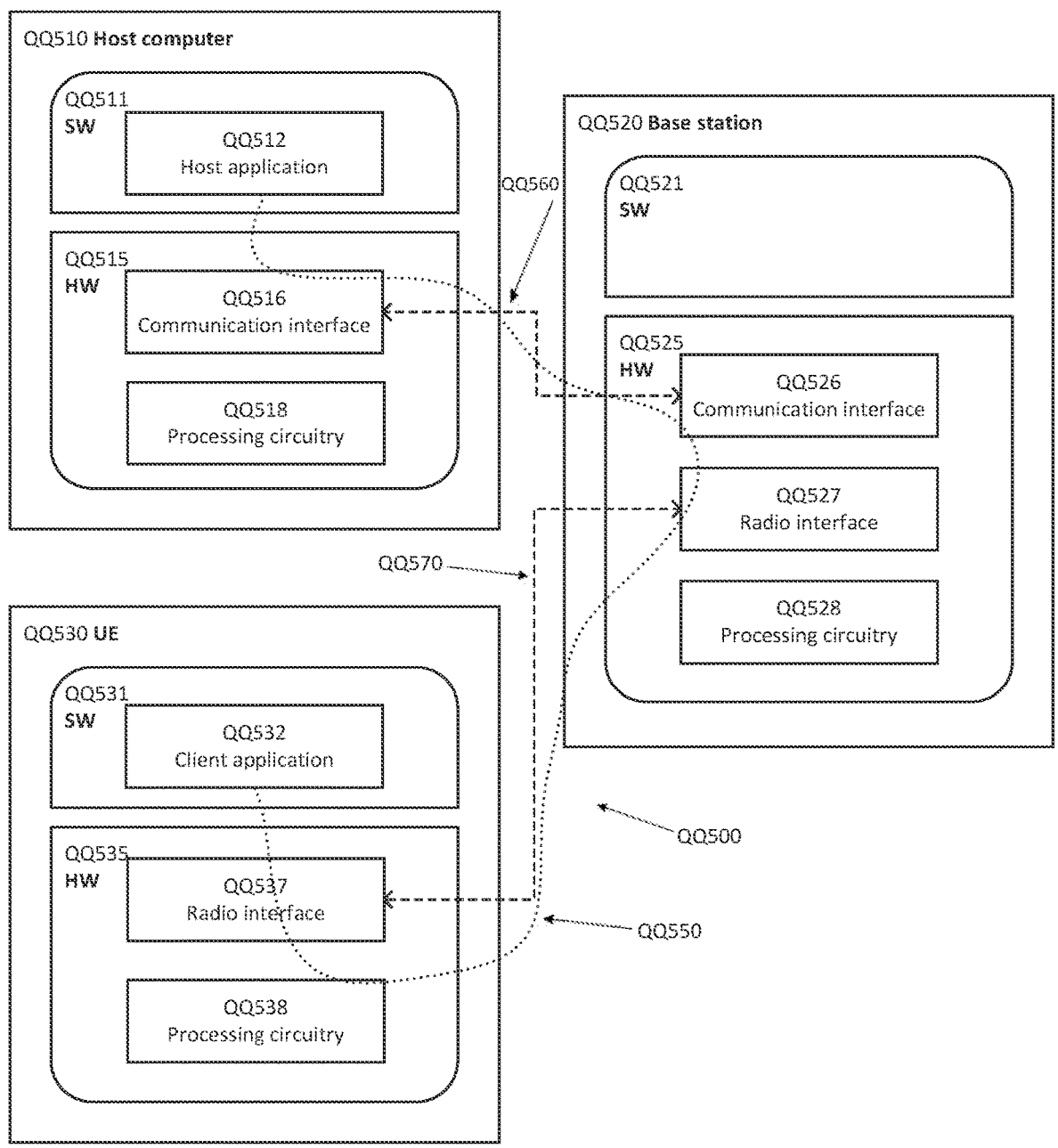
FIG. 13 is a block diagram illustrating a host computer, base station, and UE according to some embodiments of inventive concepts.

It is noted that host computer QQ510, base station QQ520 and UE QQ530 illustrated in FIG. 13 may be similar or identical to host computer QQ430, one of base stations QQ412a. QQ412b, QQ412c and one of UEs QQ491, QQ492 of FIG. 12, respectively. This is to say, the inner workings of these entities may be as shown in FIG. 13 and independently, the surrounding network topology may be that of FIG. 12.

In FIG. 13, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may provide redundancy for uplink/downlink communications through the wireless communication network and thereby provide benefits such as improved reliability.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 14:
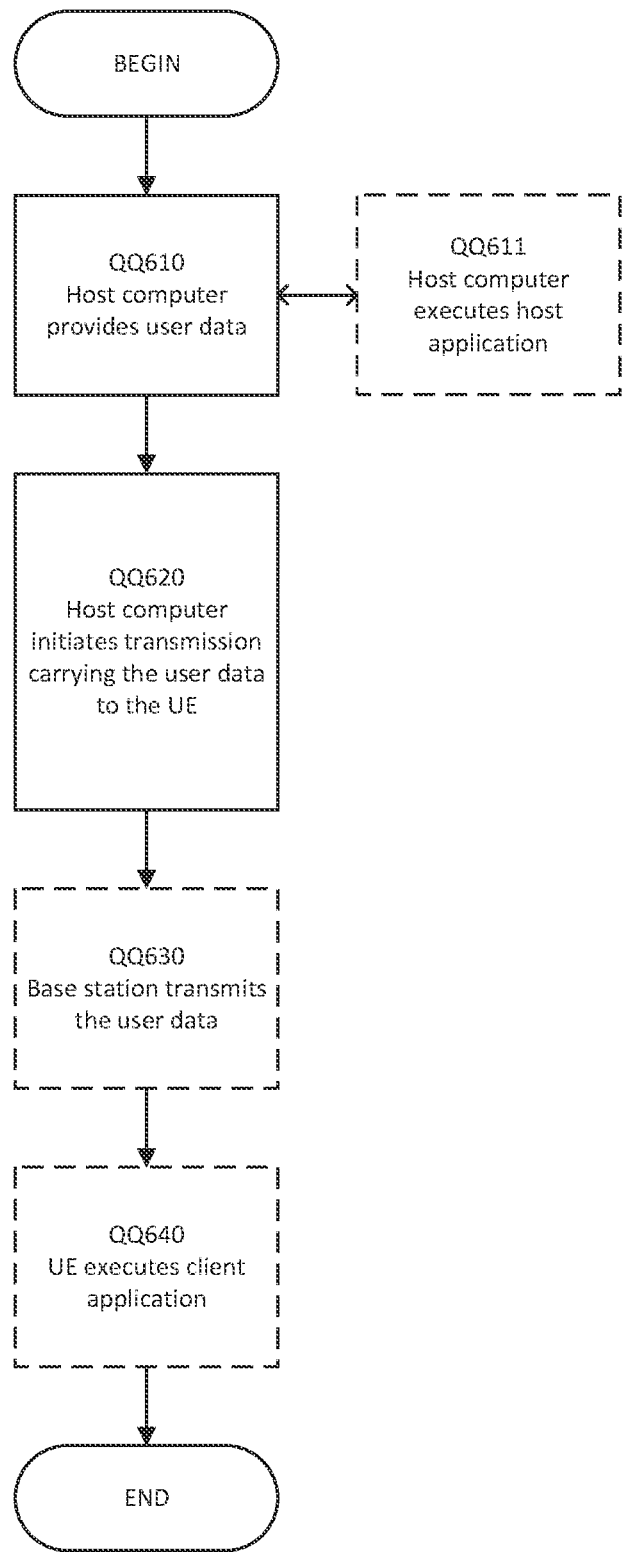
FIG. 14 is a flow chart illustrating operations in a communication system according to some embodiments of inventive concepts.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 15:
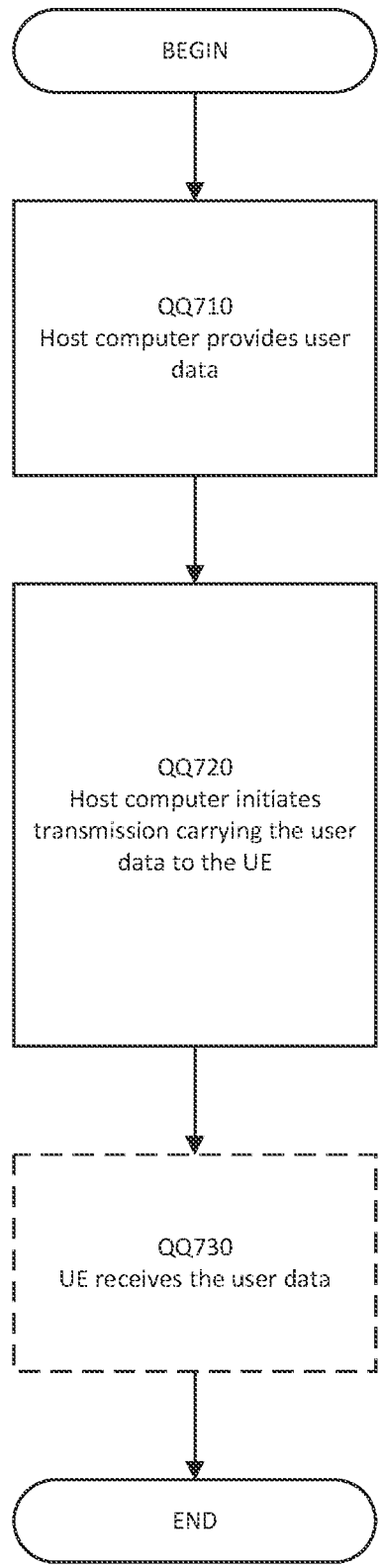
FIG. 15 is a flow chart illustrating operations in a communication system according to some embodiments of inventive concepts.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 16:
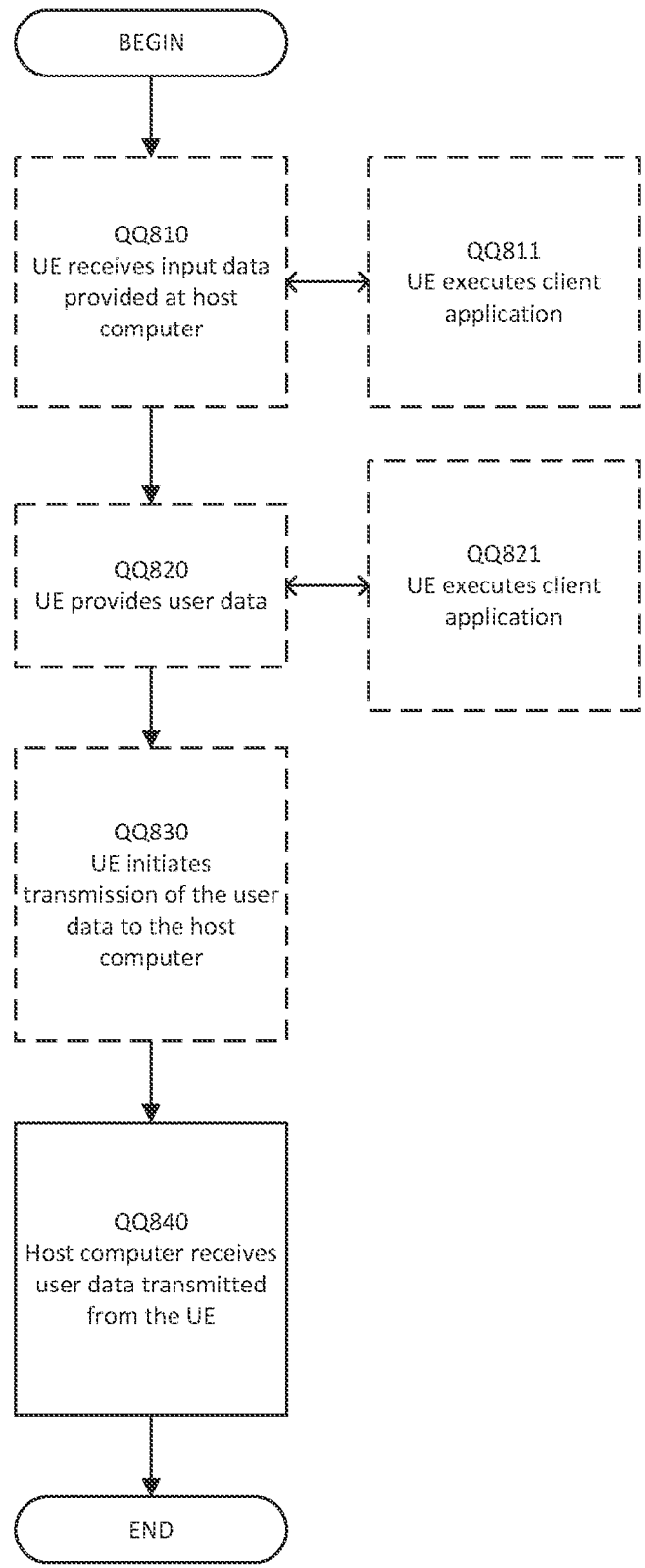
FIG. 16 is a flow chart illustrating operations in a communication system according to some embodiments of inventive concepts.

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 17:
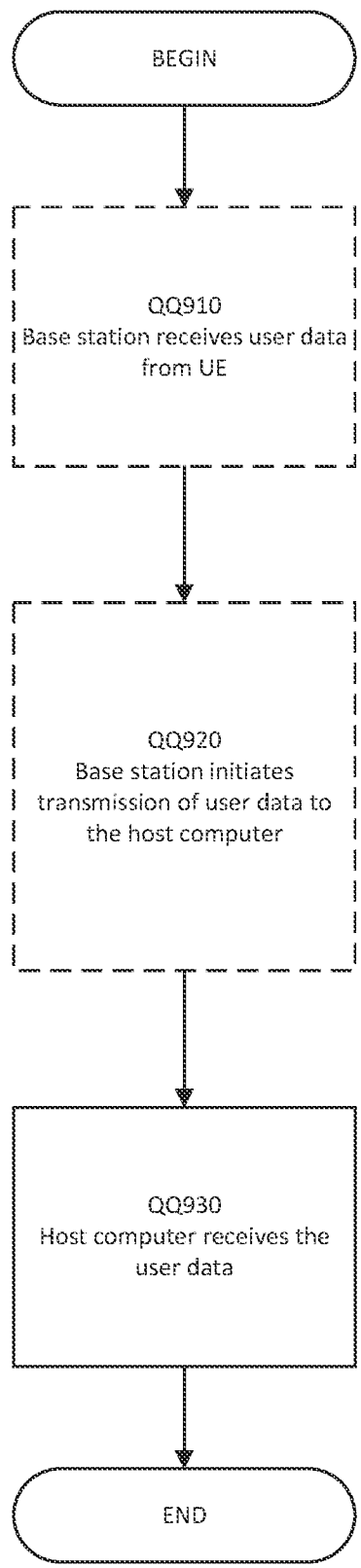
FIG. 17 is a flow chart illustrating operations in a communication system according to some embodiments of inventive concepts.

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

References from the above disclosure are identified below.

3GPP TS 38.213 V15.0.0 (2017-12), Technical Specification Group Radio Access Network; NR; Physical layer procedures for control (Release 15)

3GPP TS 36.212 V14.1.1 (2017-01). Technical Specification Group Radio Access Network; Evolved Universal Terrestrial Radio Access (E-UTRA); Multiplexing and channel coding (Release 14)

Further definitions and embodiments are discussed below.

In the above description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof. It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a wireless terminal in communication with a network node, the method comprising:
   receiving a Physical Downlink Control Channel, PDCCH, order from the network node, wherein the PDCCH order includes an identification for a Random Access CHannel, RACH, occasion to be used for a RACH message 1 preamble transmission, wherein the identification includes a first index that indicates a set of RACH occasions and a second index that indicates the RACH occasion associated with the set; and
   responsive to the PDCCH order, transmitting a Message 1 preamble to the network node using the RACH occasion indicated by the first and second indexes together.

2. The method of claim 1, wherein the first index is a synchronization signal block, SSB, index that indicates a set of RACH occasions that are associated with the SSB index.

3. The method of claim 2, wherein the second index is a RACH occasion, RO, index that indicates the RACH occasion associated with the set of RACH occasions indicated by the SSB index.

4. The method of claim 1, wherein the identification is provided in Downlink Control information, DCI, carried via the PDCCH order.

5. The method of claim 1, wherein the Message 1 preamble is transmitted for a random access procedure, the method further comprising:
   after transmitting the Message 1 preamble, receiving a Message 2 random access response of the random access procedure from the network node.

6. The method of claim 5 further comprising:
   responsive to receiving the Message 2 random access response, transmitting a Message 3 for the random access procedure to the network node on an uplink channel.

7. The method of claim 6 further comprising:
   after transmitting the Message 3, receiving a contention resolution message of the random access procedure from the network node.

8. The method of claim 1, wherein the first index indicates a time resource of a plurality of time resources in a RACH configuration period.

9. A method of operating a network node in communication with a wireless terminal, the method comprising:
   transmitting a Physical Downlink Control Channel, PDCCH, order to the wireless terminal, wherein the PDCCH order includes an identification for a Random Access CHannel, RACH, occasion to be used for a RACH message 1 preamble transmission from the wireless terminal, wherein the identification includes a first index that indicates a set of RACH occasions and a second index that indicates the RACH occasion associated with the set; and receiving a Message 1 preamble from the wireless terminal using the RACH occasion indicated by the first and second indexes together.

10. The method of claim 9, wherein the first index is a synchronization signal block, SSB, index that indicates a set of RACH occasions that are associated to the SSB index.

11. The method of claim 10, wherein the second index is a RACH occasion, RO, index that indicates the RACH occasion associated with the set of RACH occasions indicated by the SSB index.

12. The method of claim 9, wherein the identification is provided in Downlink Control information, DCI, carried via the PDCCH order.

13. The method of claim 9, wherein the Message 1 preamble is received for a random access procedure, the method further comprising:

responsive to receiving the Message 1 preamble, transmitting a Message 2 random access response of the random access procedure to the wireless terminal.

14. The method of claim 13 further comprising:

after transmitting the Message 2 random access response, receiving a Message 3 for the random access procedure on an uplink channel from the wireless terminal.

15. The method of claim 14 further comprising:

after receiving the Message 3, transmitting a contention resolution message of the random access procedure to the wireless terminal.

16. The method of claim 9, wherein the first index indicates a time resource of a plurality of time resources in a RACH configuration period.

17. A wireless terminal configured for communication with a network node, the wireless terminal comprising:

a transceiver configured to provide wireless communication with the network node in a wireless communication network; and a processor circuit coupled with the transceiver, wherein the processor circuit is configured to provide wireless communication with the wireless communication network through the transceiver, wherein the processor circuit is further configured to, receive a Physical Downlink Control Channel, PDCCH, order from the network node, wherein the PDCCH order includes an identification for a Random Access CHannel, RACH, occasion to be used for a RACH message 1 preamble transmission, wherein the identification includes a first index that indicates a set of RACH occasions and a second index that indicates the RACH occasion associated with the set, and transmit a Message 1 preamble to the network node using the RACH occasion indicated by the first and second indexes together responsive to the PDCCH order.

18. The wireless terminal of claim 17, wherein the first index is a synchronization signal block, SSB, index that indicates a set of RACH occasions that are associated with to the SSB index.

19. The wireless terminal of claim 17, wherein the identification is provided in Downlink Control information, DCI, carried via the PDCCH order.

20. The wireless terminal of claim 17, wherein the Message 1 preamble is transmitted for a random access procedure, wherein the processor circuit is further configured to, receive a Message 2 random access response of the random access procedure from the network node after transmitting the Message 1 preamble.

21. The wireless terminal of claim 20, wherein the processor circuit is further configured to:

after receiving the Message 2, transmitting a Message 3 for the random access procedure to the network node on an uplink channel; and after transmitting the Message 3, receiving a contention resolution message of the random access procedure from the network node.

22. A network node configured for communication with a wireless terminal, the network node comprising:

a transceiver configured to provide wireless communication with a wireless terminal; and a processor circuit coupled with the transceiver, wherein the processor circuit is configured to provide wireless communication with a wireless terminal through the transceiver, and wherein the processor circuit is further configured to, transmit a Physical Downlink Control Channel, PDCCH, order to the wireless terminal, wherein the PDCCH order includes an identification for a Random Access CHannel, RACH, occasion to be used for a RACH message 1 preamble transmission from the wireless terminal, wherein the identification includes a first index that indicates a set of RACH occasions and a second index that indicates the RACH occasion associated with the set, and receive a Message 1 preamble from the wireless terminal using the RACH occasion indicated by the first and second indexes together.

23. The network node of claim 22, wherein the first index is a synchronization signal block, SSB, index that indicates a set of RACH occasions that are associated with the SSB index.

24. The network node of claim 22, wherein the identification is provided in Downlink Control information, DCI, carried via the PDCCH order.

25. The network node of claim 22, wherein the Message 1 preamble is received for a random access procedure, wherein the network node is further adapted to:

transmit a Message 2 random access response of the random access procedure to the wireless terminal responsive to receiving the Message 1 preamble.

26. The network node of claim 25, wherein the processor circuit is further configured to:

after transmitting the Message 2, receiving a Message 3 for the random access procedure on an uplink channel from the wireless terminal; and after receiving the Message 3, transmitting a contention resolution message of the random access procedure to the wireless terminal.

* * * * *